US012014682B2

(12) United States Patent
Kim et al.

(10) Patent No.: US 12,014,682 B2
(45) Date of Patent: Jun. 18, 2024

(54) ELECTROLUMINESCENT DISPLAY DEVICE AND METHOD FOR DRIVING SAME

(71) Applicant: LG DISPLAY CO., LTD., Seoul (KR)

(72) Inventors: So Jeong Kim, Busan (KR); Nam Hun Oh, Paju-si (KR)

(73) Assignee: LG DISPLAY CO., LTD., Seoul (KR)

(*) Notice: Subject to any disclaimer, the term of this patent is extended or adjusted under 35 U.S.C. 154(b) by 0 days.

(21) Appl. No.: 17/520,957

(22) Filed: Nov. 8, 2021

(65) Prior Publication Data

US 2022/0189393 A1 Jun. 16, 2022

(30) Foreign Application Priority Data

Dec. 14, 2020 (KR) ........................ 10-2020-0174229

(51) Int. Cl.
*G09G 3/3233* (2016.01)

(52) U.S. Cl.
CPC ... *G09G 3/3233* (2013.01); *G09G 2320/0233* (2013.01); *G09G 2320/0276* (2013.01); *G09G 2320/0626* (2013.01); *G09G 2320/0673* (2013.01)

(58) Field of Classification Search
CPC ......... G09G 3/3233; G09G 2300/0866; G09G 2320/0233; G09G 2320/0257; G09G 2320/0276; G09G 2320/0626; G09G 2320/0673
See application file for complete search history.

(56) References Cited

U.S. PATENT DOCUMENTS

| | | | | |
|---|---|---|---|---|
| 7,796,143 B2 * | 9/2010 | Huang | G09G 3/3208 345/102 |
| 7,986,293 B2 * | 7/2011 | Yanamoto | G09G 3/3426 345/102 |
| 9,142,188 B2 * | 9/2015 | Kurikko | G09G 3/2081 |
| 9,418,599 B2 * | 8/2016 | Yang | G09G 3/3426 |
| 9,911,374 B2 * | 3/2018 | Park | G09G 3/2022 |
| 10,043,434 B2 * | 8/2018 | Jung | G09G 3/2003 |
| 10,490,128 B1 * | 11/2019 | Qian | G09G 3/3266 |

(Continued)

FOREIGN PATENT DOCUMENTS

| | | |
|---|---|---|
| CN | 108257549 A | 7/2018 |
| CN | 111739472 A | 10/2020 |

(Continued)

OTHER PUBLICATIONS

Chinese Office Action dated Nov. 11, 2023 issued in Patent Application No. 202111478210.8 w/English Translation (20 pages).

*Primary Examiner* — Michael J Jansen, II
(74) *Attorney, Agent, or Firm* — POLSINELLI PC

(57) ABSTRACT

An electroluminescent display device includes a display panel including a plurality of pixels each including a light-emitting element, a display brightness value adjuster configured to output brightness data with different values according to user inputs to adjust screen luminance of the display panel, a duty adjuster configured to adjust an emission duty of the light-emitting element according to the brightness data, and a power adjuster configured to adjust a low-level source voltage to be applied to the pixels within a preset power supply voltage range according to the brightness data, wherein the emission duty of the light-emitting element gradually increases from 0% to an upper limit set to be less than 100%.

18 Claims, 9 Drawing Sheets

(56) References Cited

U.S. PATENT DOCUMENTS

| | | | | |
|---|---|---|---|---|
| 10,559,261 | B2 * | 2/2020 | Chang | H01L 27/3262 |
| 10,636,359 | B2 * | 4/2020 | Zhang | G09G 3/3258 |
| 10,755,626 | B2 * | 8/2020 | Hwang | G09G 3/3208 |
| 10,971,084 | B2 * | 4/2021 | Bian | G09G 3/2003 |
| 11,011,102 | B2 * | 5/2021 | Tada | G09G 5/006 |
| 11,082,676 | B2 * | 8/2021 | Lee | H04N 9/73 |
| 11,183,113 | B2 * | 11/2021 | Lhee | G09G 3/3696 |
| 11,308,841 | B2 * | 4/2022 | Sato | G09G 3/3233 |
| 2007/0115302 | A1 * | 5/2007 | Huang | G09G 3/3208 345/690 |
| 2007/0120766 | A1 * | 5/2007 | Yanamoto | G09G 3/3426 345/38 |
| 2008/0259014 | A1 * | 10/2008 | Inoue | G09G 3/3611 345/89 |
| 2008/0309611 | A1 * | 12/2008 | Yang | G09G 3/3426 349/116 |
| 2011/0057961 | A1 * | 3/2011 | Tsuru | G09G 3/342 345/89 |
| 2012/0025716 | A1 * | 2/2012 | Nakanishi | G09G 3/3406 315/297 |
| 2012/0210229 | A1 * | 8/2012 | Bryant | G09G 5/02 715/723 |
| 2013/0147857 | A1 * | 6/2013 | Kurikko | G09G 3/2081 345/690 |
| 2016/0055799 | A1 * | 2/2016 | Eom | G09G 3/3225 345/77 |
| 2016/0189620 | A1 * | 6/2016 | Park | G09G 3/3258 345/76 |
| 2017/0053581 | A1 * | 2/2017 | Jung | G09G 3/3275 |
| 2019/0051247 | A1 * | 2/2019 | Chang | H01L 27/3262 |
| 2019/0088193 | A1 * | 3/2019 | Tada | G06F 3/04847 |
| 2019/0088205 | A1 * | 3/2019 | Zhang | G09G 3/3233 |
| 2019/0180677 | A1 * | 6/2019 | Hwang | G09G 3/3233 |
| 2019/0371237 | A1 * | 12/2019 | Qian | G09G 3/3266 |
| 2020/0234655 | A1 * | 7/2020 | Bian | G09G 3/2003 |
| 2020/0312240 | A1 * | 10/2020 | Lhee | G09G 3/3225 |
| 2021/0027726 | A1 * | 1/2021 | Lee | H04N 9/3182 |
| 2021/0183290 | A1 * | 6/2021 | Sato | G09G 3/20 |
| 2023/0018404 | A1 * | 1/2023 | Zen | G09G 3/3208 |

FOREIGN PATENT DOCUMENTS

| | | | |
|---|---|---|---|
| KR | 10-2011-0024934 | A | 3/2011 |
| KR | 10-2019-0074847 | A | 6/2019 |

* cited by examiner

FIG. 4

| Band | DBV setting | Target Luminance (nits) |
|---|---|---|
| 1 | A | 1200 |
| 2 | B | 1000 |
| 3 | C | 650 |
| 4 | D | 300 |
| 5 | E | 200 |
| 6 | F | 100 |
| 7 | G | 60 |
| 8 | H | 30 |
| 9 | I | 15 |
| 10 | J | 10 |
| 11 | K | 4 |

FIG. 10

| Duty (%) | Luminance |
|---|---|
| 84 | 0.2252 |
| 85 | 0.2272 |
| 86 | 0.2296 |
| 87 | 0.2315 |
| 88 | 0.2335 |
| 89 | 0.2358 |
| 90 | 0.2373 |
| 91 | 0.2379 |
| 92 | 0.2387 |
| 93 | 0.2387 |
| 94 | 0.2384 |
| 95 | 0.237 |
| 96 | 0.2365 |
| 97 | 0.2311 |
| 98 | 0.223 |
| 99 | 0.2173 |
| 100 | 0.194 |

Luminance increase section (0~87%)

Luminance stagnation section (88~94%)

Luminance decrease section (95~100%)

ELECTROLUMINESCENT DISPLAY DEVICE AND METHOD FOR DRIVING SAME

CROSS-REFERENCE TO RELATED APPLICATION

This application claims the benefit of Korean Patent Application No. 10-2020-0174229, filed on Dec. 14, 2020, which is hereby incorporated by reference in its entirety as if fully set forth herein.

BACKGROUND

Field of the Disclosure

The present disclosure relates to an electroluminescent display device and a method for driving the same.

Description of the Background

An electroluminescent display device includes pixels arranged in a matrix form and displays an image by causing light-emitting elements included in the pixels to emit light. An electroluminescent display device controls the luminance of an image according to a data voltage corresponding to image data and has a problem of picture quality deterioration such as low luminance uniformity and afterimage in a low luminance section.

SUMMARY

Accordingly, the present disclosure provides an electroluminescent display device and a method for driving the same to improve image quality.

Also, the present disclosure provides an electroluminescent display device and a method for driving the same to curb a luminance reversal phenomenon in a low luminance section to improve image quality.

An electroluminescent display device according to the present disclosure includes a display panel including a plurality of pixels each including a light-emitting element, a DBV adjuster configured to output brightness data with different values according to user inputs to adjust screen luminance of the display panel, a duty adjuster configured to adjust an emission duty of the light-emitting element according to the brightness data, and a power adjuster configured to adjust a low-level source voltage to be applied to the pixels according to the brightness data, wherein the screen luminance includes a first luminance section and a second luminance section having luminance higher than luminance of the first luminance section, the emission duty of the light-emitting element gradually increases to an upper limit set to be less than 100% in the first luminance section and is fixed to the upper limit in the second luminance section.

An electroluminescent display device according to the present disclosure includes a display panel including a plurality of pixels each including a light-emitting element, a DBV adjuster configured to output brightness data with different values according to user inputs to adjust screen luminance of the display panel, a duty adjuster configured to adjust an emission duty of the light-emitting element according to the brightness data, and a power adjuster configured to adjust a low source voltage to be applied to the pixels within a preset power supply voltage range according to the brightness data, wherein the emission duty of the light-emitting element gradually increases from 0% to an upper limit set to be less than 100%, and the low-level source voltage is fixed to a highest level within the power supply voltage range in a low luminance section of the screen luminance.

A method for driving an electroluminescent display device having a display panel including a plurality of pixels each including a light-emitting element according to the present disclosure includes outputting brightness data with different values according to user inputs to adjust screen luminance of the display panel, adjusting an emission duty of the light-emitting element according to the brightness data, and adjusting a low source voltage to be applied to the pixels according to the brightness data, wherein the screen luminance includes a first luminance section and a second luminance section having luminance higher than luminance of the first luminance section, the emission duty of the light-emitting element gradually increases to an upper limit set to be less than 100% in the first luminance section and is fixed to the upper limit in the second luminance section.

A method for driving an electroluminescent display device having a display panel including a plurality of pixels each including a light-emitting element according to the present disclosure includes outputting brightness data with different values according to user inputs to adjust screen luminance of the display panel, adjusting an emission duty of the light-emitting element according to the brightness data, and adjusting a low-level source voltage to be applied to the pixels within a preset power supply voltage range according to the brightness data, wherein the emission duty of the light-emitting element gradually increases from 0% to an upper limit set to be less than 100%, and the low-level source voltage is fixed to a highest level within the power supply voltage range in a low luminance section of the screen luminance.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings:

FIG. 4 and FIG. 5 are diagrams for describing operation of a DBV adjuster shown in FIG. 1;

FIG. 9 and FIG. 10 are diagrams showing luminance variation according to emission duty;

DETAILED DESCRIPTION

Figure 1:
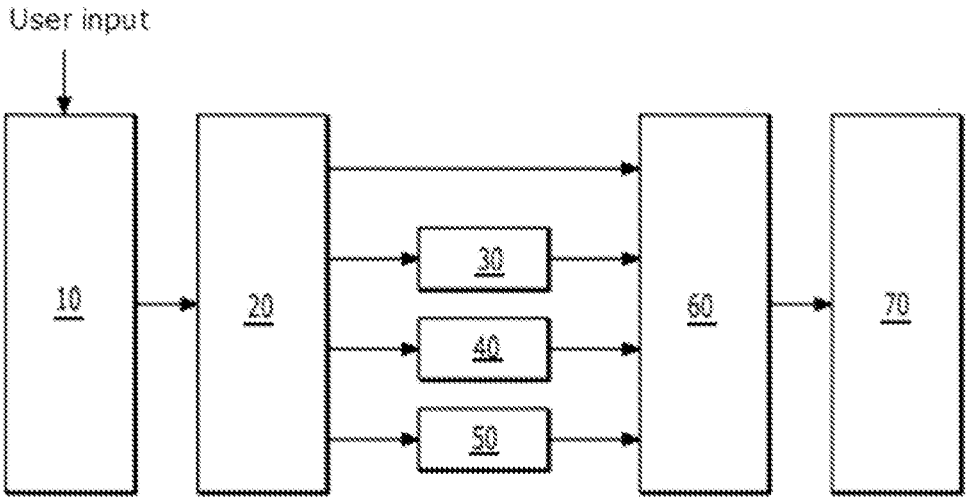
FIG. 1 is a block diagram showing an electroluminescent display device according to an aspect of the present disclosure.

The advantages and features of the present disclosure and the way of attaining the same will become apparent with reference to aspects described below in detail in conjunction with the accompanying drawings. The present disclosure, however, is not limited to the aspects disclosed hereinafter and may be embodied in many different forms. Rather, these exemplary aspects are provided so that this disclosure will be through and complete and will fully convey the scope to those skilled in the art. Thus, the scope of the present disclosure should be defined by the claims.

The shapes, sizes, ratios, angles, numbers, and the like, which are illustrated in the drawings in order to describe aspects of the present disclosure, are merely given by way of example, and therefore, the present disclosure is not limited to the illustrations in the drawings. The same elements are designated by the same reference numerals throughout the specification. In the present disclosure, when the terms “comprise”, “include”, and the like are used, other elements may be added unless the term “only” is used. An element described in the singular form is intended to include a plurality of elements unless the context clearly indicates otherwise.

In the interpretation of constituent elements included in the various aspects of the present disclosure, the constituent elements are interpreted as including an error range even if there is no explicit description thereof.

When describing positional relationships, for example, when the positional relationship between two parts is described using “on”, “above”, “below”, “beside”, or the like, one or more other parts may be located between the two parts unless the term “directly” or “closely” is used.

In the description of the various aspects of the present disclosure, although terms such as “first” and “second” may be used to describe various elements, these terms are merely used to distinguish the same or similar elements from each other. Therefore, in the present disclosure, an element modified by “first” may be the same as an element modified by “second” within the technical scope of the present disclosure unless otherwise mentioned.

Hereinafter, aspects of the present disclosure will be described in detail with reference to the attached drawings. In the following description, if a detailed description of known techniques associated with the present disclosure would unnecessarily obscure the gist of the present disclosure, detailed description thereof will be omitted.

Figure 2:
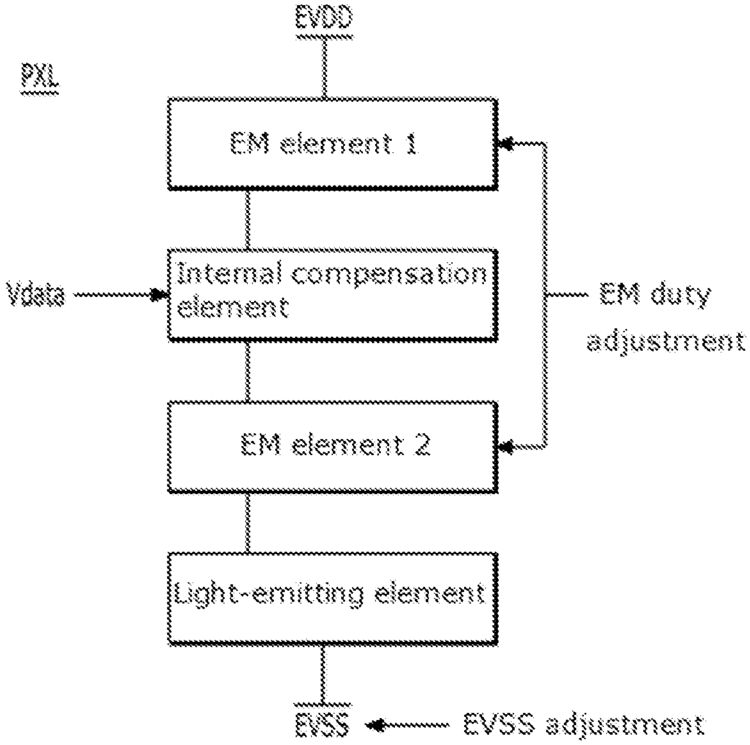
FIG. 2 is a diagram showing a schematic configuration of a pixel of the electroluminescent display device.

FIG. 1 is a block diagram showing an electroluminescent display device according to an aspect of the present disclosure and FIG. 2 is a diagram showing a schematic configuration of a pixel of the electroluminescent display device.

Referring to FIG. 1, an electroluminescent display device according to the present disclosure may include a DBV adjuster 10, a timing controller 20, a duty adjuster 30, a power adjuster 40, a gamma adjuster 50, a panel driver 60, and a display panel 70.

The display panel 70 includes a pixel array in which a plurality of signal lines is arranged in an intersecting manner and pixels PXL are disposed in a matrix form.

Each pixel PXL may include a light-emitting element, a driving element, and an EM element, as shown in FIG. 2. The light-emitting element may be implemented as an organic light-emitting diode or an inorganic light-emitting diode, and the driving element and the EM element may be implemented as a silicon or oxide based transistor. The driving element may be an internal compensation element in which driving characteristics such as a threshold voltage are automatically compensated, but the present disclosure is not limited thereto. The EM element may include EM element 1 connected to an input terminal to which a high-level source voltage EVDD is input and EM element 2 connected to the light-emitting element, but the present disclosure is not limited thereto. Each pixel PXL may further include at least one switching element and capacitor used to reflect a threshold voltage in a gate-source voltage of the driving element.

The pixels PXL may include red pixels, green pixels, blue pixels, and white pixels. Four pixels including a red pixel, a green pixel, a blue pixel, and a white pixel may constitute a unit pixel for color expression. A color expressed by a unit pixel may be determined by an emission ratio of the red pixel, the green pixel, the blue pixel, and the white pixel. Meanwhile, the while pixel may be omitted from the unit pixel.

The pixel array may include data lines for supplying a data voltage Vdata to the pixels PXL, gate lines for supplying a gate signal to the pixels PXL, and a first power line for supplying the high-level source voltage EVDD to the pixels PXL. The pixel array may further include a second power line for supplying an initialization voltage to the pixels PXL.

The panel driver 60 may include a data driver connected to the data lines of the display panel 70 and a gate driver connected to the gate lines of the display panel 70.

The data driver may include a digital-to-analog converter (DAC) that converts input image data received from the timing controller 20 into a data voltage Vdata. The DAC converts the input image data into a gamma compensation voltage with reference to an output voltage range of a gamma voltage string adjusted by the gamma adjuster 50 and provides the gamma compensation voltage to the data lines as a data voltage Vdata. The data driver provides the high-level source voltage EVDD generated by the power adjuster 40 to the first power line and provides the initialization voltage generated by the power adjuster 40 to the second power line. Meanwhile, a low-level source voltage EVSS adjusted by the power adjuster 40 may be directly supplied to the pixels PXL without passing through the data driver or may be supplied to the pixels PXL through the data driver and an additional power line.

The data driver may be manufactured in the form of a chip and then directly mounted on a non-display area of the display panel 70 or may be manufactured as an integrated circuit (IC) and then bonded to the display panel 70 through a conductive film.

The gate driver generates a gate signal and provides the gate signal to the gate lines. The gate signal may include a scan signal applied to the switching element included in each pixel PXL and an emission signal applied to the EM element included in each pixel PXL. The scan signal is used to select pixels PXL in which a data voltage Vdata will be charged in units of a line in one direction. The emission signal is used to determine an emission period of pixels PXL in one frame.

The gate driver adjusts pulse width modulation (PWM) of the emission signal under the control of the duty adjuster 30. An emission duty of a light-emitting element conforms to a PWM duty of the emission signal.

The gate driver may be directly formed in the non-display area of the display panel 70 along with the pixel array through a gate-driver in panel (GIP) process or may be manufactured as an IC and then bonded to the display panel 70 through a conductive film.

The timing controller 20 receives digital data of an input image and a set timing signal synchronized with the digital data from a host system. The set timing signal includes a vertical synchronization signal Vsync, a horizontal synchronization signal Hsync, a data enable signal DE, and the like. The host system may be any of a television (TV) system, a set-top box, a navigation system, a DVD player, a Blu-ray player, a personal computer (PC), a home theater system, and a phone system, but the present disclosure is not limited thereto.

The timing controller 20 generates a data timing control signal for controlling operation timing of the data driver and a gate timing control signal for controlling operation timing of the gate driver based on the set timing signal Vsync, Hsync, and DE and transmits the same to the panel driver 60.

The DBV adjuster 10 outputs brightness data with different values according to user inputs to adjust the luminance of the screen realized by the display panel 70. The brightness data may be display brightness values (DBVs) corresponding to preset luminance bands. DBVs output from the DBV adjuster 10 may be transmitted to the duty adjuster 30, the power adjuster 40, and the gamma adjuster 50 through the timing controller 20.

The duty adjuster 30 adjusts an emission duty of a light-emitting element, that is, a PWM duty of an emission signal, according to DBV. The power adjuster 40 adjusts the low-level source voltage EVSS to be applied to the pixels PXL according to the DBV. Since the emission duty of the light-emitting element and the low-level source voltage EVSS are adjusted in correlation, image quality can be improved and smooth and natural brightness change can be realized in the entire luminance period in which screen luminance is realized.

The gamma adjuster 50 adjusts an output voltage range of a gamma voltage string according to DBV. Since the output voltage range of the gamma voltage string is adjusted in correlation with the emission duty of the light-emitting element and the low-level source voltage EVSS, image quality can be further improved in the entire luminance section in which screen luminance is realized.

Figure 3:
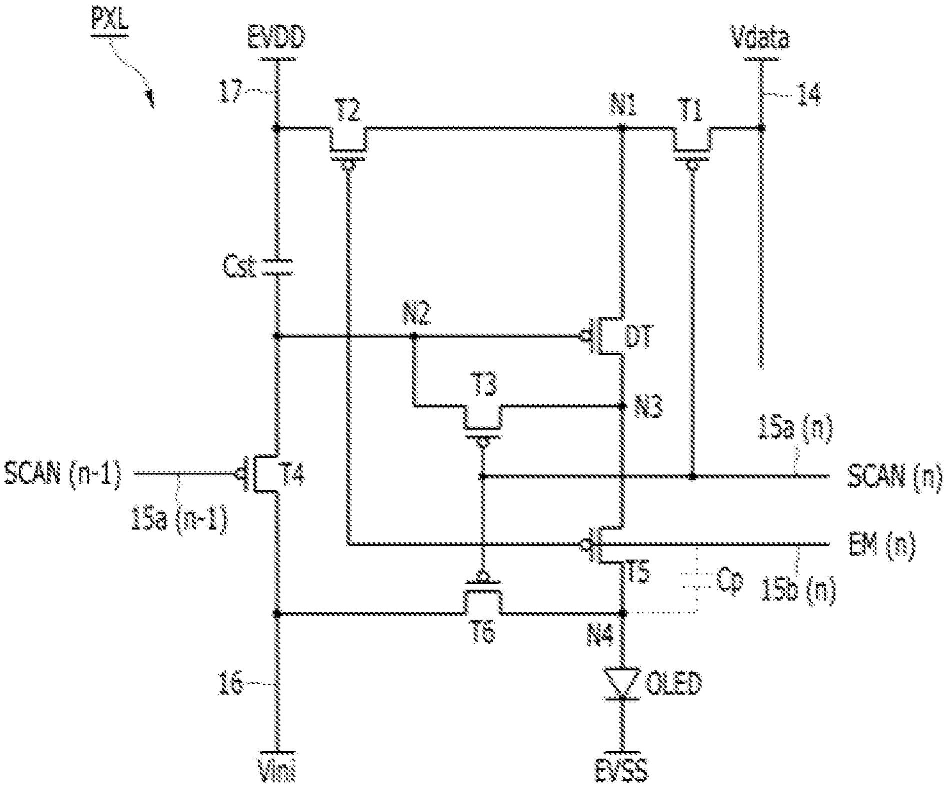
FIG. 3 is a diagram showing an example of a specific pixel circuit corresponding to FIG. 2.

FIG. 3 is a diagram showing an example of a specific pixel circuit corresponding to FIG. 2.

Referring to FIG. 3, a pixel PXL according to an aspect of the present disclosure includes an organic light-emitting diode (OLED), a plurality of thin film transistors (TFTs) T1 to T6 and DT, and a storage capacitor Cst. The TFTs T1 to T6 and DT may be implemented as low temperature polysilicon based p-channel TFTs to secure desired response characteristics. However, the technical spirit of the present disclosure is not limited thereto. For example, at least one of the switching TFTs T1 to T6 may be implemented as an oxide based n-channel TFT having an excellent off current characteristic and the remaining TFTs may be implemented as low temperature polysilicon based p-channel TFTs having excellent response characteristics.

The OLED is a light-emitting element that emits light according to driving current. An anode of the OLED is connected to a node N4 and a cathode thereof is connected to an input terminal to which the low-level source voltage EVSS is applied. An organic compound layer is provided between the anode and the cathode.

The driving TFT DT is a driving element that controls the driving current flowing through the OLED according to a gate-source voltage. The driving TFT DT includes a gate electrode connected to a node N2, a first electrode connected to a node N1, and a second electrode connected to a node N3.

A first switching TFT T1 is a switching element that is connected between a data line 14 and the node N1 and switches according to an n-th scan signal SCAN(n). A gate electrode of the first switching TFT T1 is connected to an n-th first gate line 15*a*(*n*) to which the n-th scan signal SCAN(n) is applied, a first electrode thereof is connected to the data line 14, and a second electrode thereof is connected to the node N1.

A first EM TFT T2 is an EM element that is connected between a first power line 17 and the node N1 and switches according to an n-th emission signal EM(n) and is an emission control transistor. A gate electrode of the first EM TFT T2 is connected to an n-th second gate line 15*b*(*n*) to which the n-th emission signal EM(n) is applied, a first electrode thereof is connected to the first power line 17, and a second electrode thereof is connected to the node N1.

A second switching TFT T3 is a switching element that is connected between the node N2 and the node N3 and switches according to the n-th scan signal SCAN(n). A gate electrode of the second switching TFT T3 is connected to the n-th first gate line 15*a*(*n*) to which the n-th scan signal SCAN(n) is applied, a first electrode thereof is connected to the node N3, and a second electrode thereof is connected to the node N2.

A third switching TFT T4 is a switching element that is connected between the node N2 and a second power line 16 and switches according to an (n−1)-th scan signal SCAN (n−1). A gate electrode of the third switching TFT T4 is connected to an (n−1)-th first gate line 15*a*(*n*−1) to which the (n−1)-th scan signal SCAN(n−1) is applied, a first electrode thereof is connected to the node N2, and a second electrode thereof is connected to the second power line 16.

A second EM TFT T5 is an EM element that is connected between the node N3 and the node N4 and switches according to the n-th emission signal EM(n) and is an emission control transistor. A gate electrode of the second EM TFT T5 is connected to the n-th second gate line 15*b*(*n*) to which the n-th emission signal EM(n) is applied, a first electrode thereof is connected to the node N3, and a second electrode thereof is connected to the node N4.

A fourth switching TFT T6 is a switching element that is connected between the node N4 and the second power line 16 and switches according to the n-th scan signal SCAN(n). A gate electrode of the fourth switching TFT T6 is connected to the n-th first gate line 15*a*(*n*) to which the n-th scan signal SCAN(n) is applied, a first electrode thereof is connected to the node N4, and a second electrode thereof is connected to the second power line 16.

The storage capacitor Cst is connected between the first power line 17 and the node N2.

The pixel PXL shown in FIG. 3 may operate sequentially through an initialization period, a sampling period, an emission period, and a PWM driving period.

In the initialization period, the node N2 is reset to an initialization voltage Vinit and voltages of floating nodes N1 and N3 become a specific voltage lower than the high-level source voltage EVDD.

In the sampling period, the threshold voltage of the driving TFT DT is sampled and stored in the nodes N2 and N3. The gate-source voltage of the driving TFT DT becomes the threshold voltage of the driving TFT DT for the sampling period.

In the emission period, the OLED emits light according to driving current flowing through the driving TFT DT.

In the PWM driving period, flow of the driving current is cut and emission of the OLED stops because the EM TFTs T2 and T5 are turned off. An emission duty (or EM duty) is determined according to a duration of the PWM driving period in one frame. When the OLED is repeatedly turned on and turned off at the determined emission duty, afterimage is minimized at the time of low grayscale representation.

The technical spirit of the present disclosure is not limited to the structure of the pixel PXL shown in FIG. 3. It should be noted that the technical spirit of the present disclosure can be applied to any pixel structure in which the emission duty (or EM duty) and the low-level source voltage can be adjusted. The emission duty (or EM duty) and the low-level source voltage can be adjusted in correlation in response to a DBV according to user input.

Figure 5:
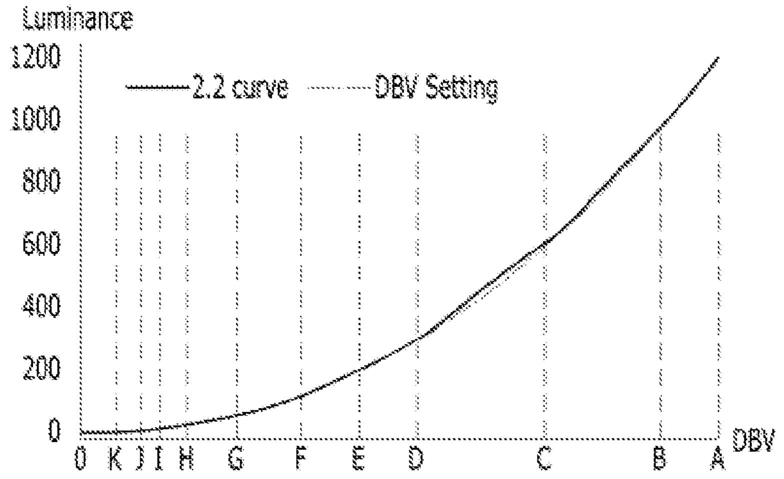

FIG. 4 and FIG. 5 are diagrams for describing operation of the DBV adjuster shown in FIG. 1.

The DBV adjuster (10 in FIG. 1) outputs a DBV corresponding to user input to adjust screen luminance, as shown in FIG. 4. When a brightness control bar provided in the screen is scrolled according to user input and thus a luminance band changes, the DBV adjuster outputs a DBV corresponding to the changed luminance band. Various numbers of luminance bands may be designed in advance. In the example of FIG. 4, band 1 corresponds to a highest DBV and band 11 corresponds to a lowest DBV, but the luminance bands may be designed such that band 1 corresponds to a lowest DBV and band 11 corresponds to a highest DBV. In the example of FIG. 4, only DBVs (A to K) corresponding to maximum values of bands are presented. However, a larger number of DBVs than that shown in the figure may be represented through M (M being a natural number of 6 or more) bits.

The DBVs (A to K) may represent different luminance bands (i.e., bands 1 to 11). Target luminance values corresponding to the DBVs (A to K) may be preset such that they match a gamma compensation curve (e.g., 2.2 curve) as shown in FIG. 5. The gamma compensation curve is stored in the form of a look-up table in the DAC of the data driver. In the curve graph of FIG. 5, target luminance values between neighboring bands may be derived according to interpolation of DBVs (A to K).

Figure 6:
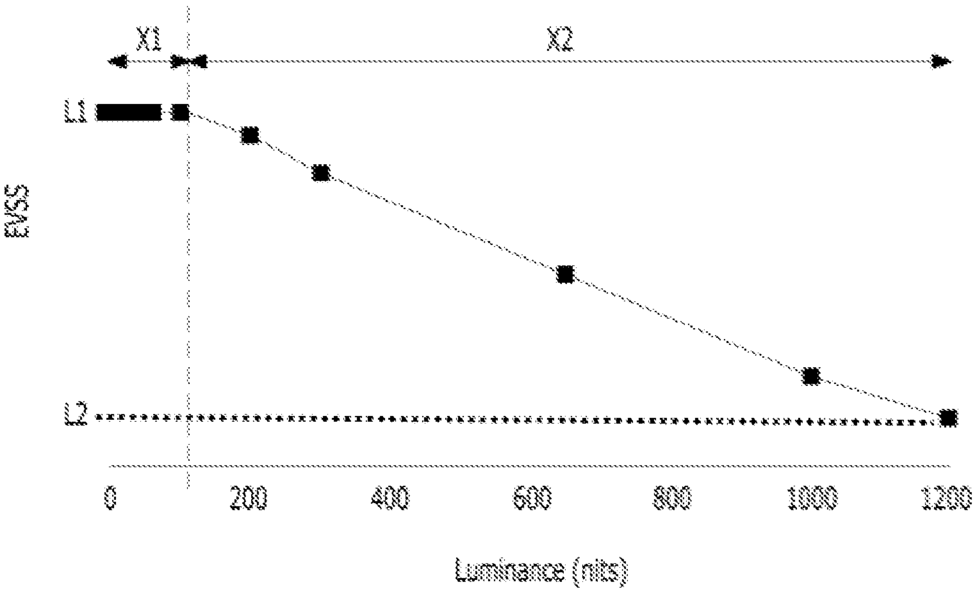
FIG. 6 is a diagram for describing operation of a power adjuster shown in FIG. 1.
Figure 7:
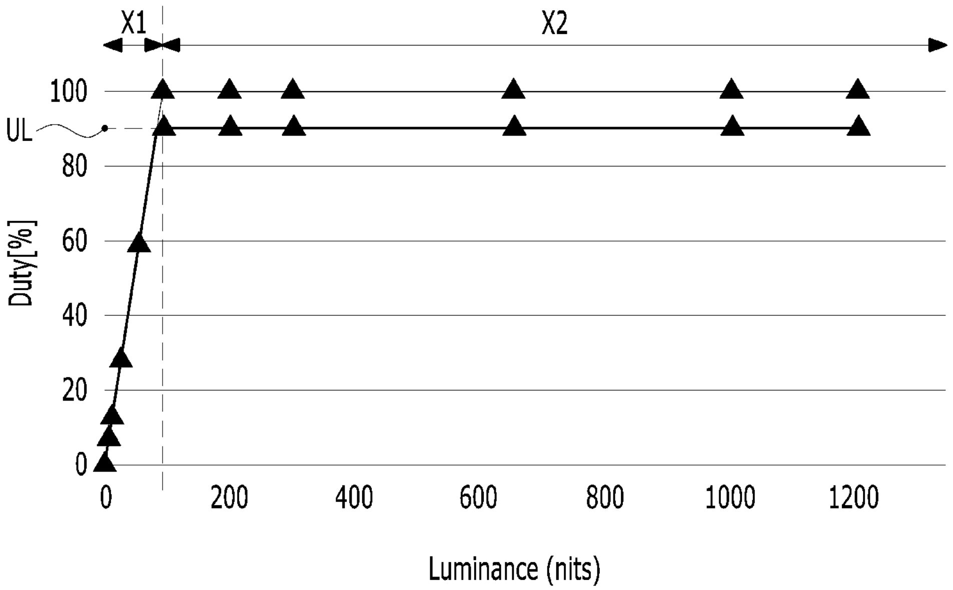
FIG. 7 is a diagram for describing operation of a duty adjuster shown in FIG. 1.
Figure 8:
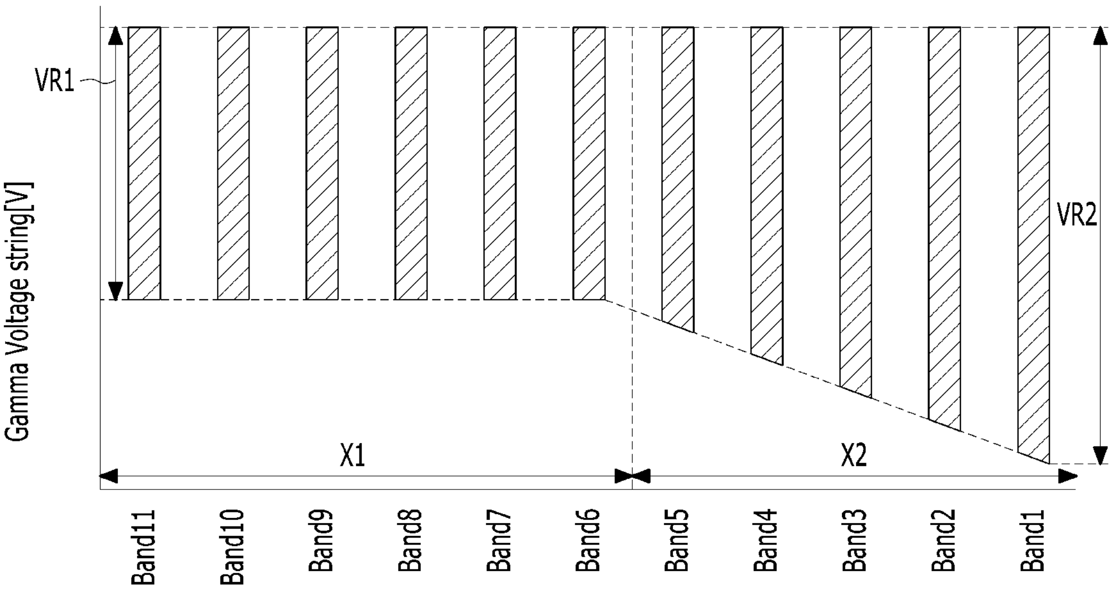
FIG. 8 is a diagram for describing operation of a gamma adjuster shown in FIG. 1.

FIG. 6 is a diagram for describing operation of the power adjuster shown in FIG. 1. FIG. 7 is a diagram for describing operation of the duty adjuster shown in FIG. 1. In addition, FIG. 8 is a diagram for describing operation of the gamma adjuster shown in FIG. 1.

The electroluminescent display device according to an aspect can improve image quality through complementary operations of the power adjuster and the duty adjuster as shown in FIG. 6 and FIG. 7. Furthermore, the electroluminescent display device according to an aspect can further improve image quality through complementary operations of the power adjuster, the duty adjuster, and the gamma adjuster as shown in FIG. 6 to FIG. 8. For example, the effects of improving low grayscale luminance uniformity, mitigating low grayscale afterimage, and reducing leakage current can be obtained.

Screen luminance according to DBV may be divided into a first luminance section X1 and a second luminance section X2, as shown in FIG. 6 and FIG. 7. Luminance of the second luminance section X2 is higher than luminance of the first luminance section X1. The first luminance section X1 corresponds to a low luminance section. The second luminance section X2 corresponds to the remaining luminance section higher than the low luminance section.

The power adjuster may adjust the low-level source voltage EVSS according to DBV, as shown in FIG. 6 within a preset power supply voltage range according to target luminance matching a gamma compensation curve. In other words, the power adjuster fixes the low-level source voltage EVSS to a first level L1 in the first luminance section X1 and gradually reduces the low-level source voltage EVSS having a second level L2 lower than the first level L1 as a lower limit in the second luminance section X2. The first level L1 is a highest level in the power supply voltage range and the second level L2 is a lowest level in the power supply voltage range.

The duty adjuster may adjust the emission duty (or EM duty) according to DBV, as shown in FIG. 7, in such a manner that it gradually increases the emission duty to an upper limit UL set to be lower than 100% in the first luminance section X1 and fixes the emission duty to the upper limit UL in the second luminance section X2. The emission duty may gradually increase from 0% to the upper limit UL in the first luminance section. In addition, the emission duty may gradually increase from J % (J being greater than 0 and less than the upper limit) to the upper limit UL in the first luminance section X1.

The gamma adjuster may adjust an output voltage range of a gamma voltage string according to DBV, as shown in FIG. 8, in such a manner that it fixes the output voltage range to a first voltage range VR1 in the first luminance section X1 and gradually increases the output voltage range to a second voltage range VR2 wider than the first voltage range VR1 in the second luminance section X2.

In the first luminance section X1, the low-level source voltage EVSS and the output voltage range of the gamma voltage string are fixed and the emission duty increases in proportion to luminance, and thus low grayscale image quality can be improved. However, the emission duty may be set to be less than 100%, desirably, set to any value in the range of 880% to 94% such that a luminance reversal phenomenon does not occur in the first luminance section X1.

In the second luminance section X2, the emission duty is fixed, the low source voltage EVSS decreases in proportion to luminance, and the output voltage range of the gamma voltage string increases in proportion to luminance, and thus power consumption can be reduced and image quality can be improved in intermediate grayscales and high grayscales.

Figure 9:
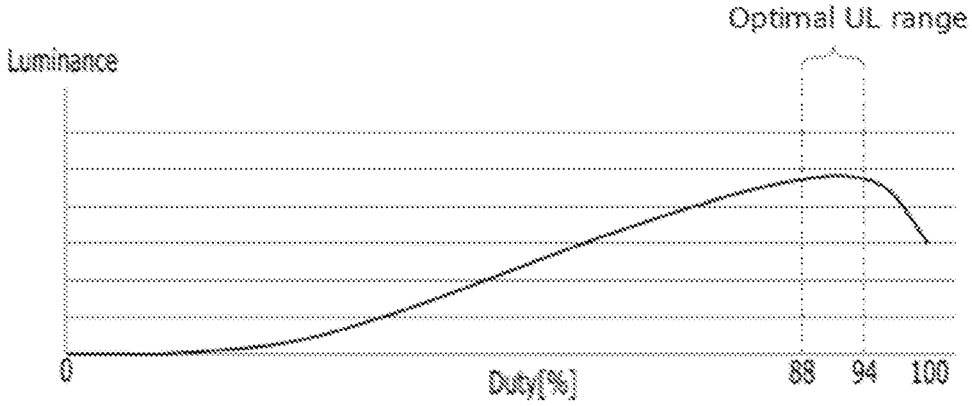
Figure 11:
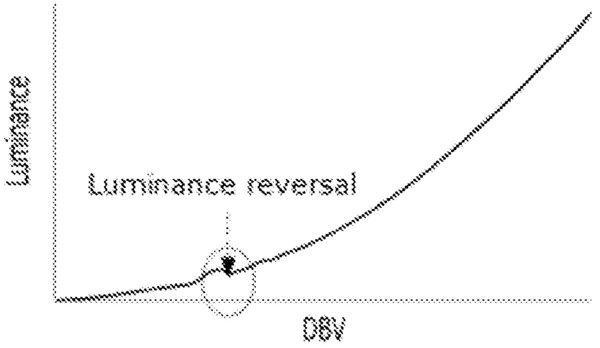
FIG. 11 is a diagram showing occurrence of a luminance reversal phenomenon when emission duty is set to 100% in a low luminance section.
Figure 12:
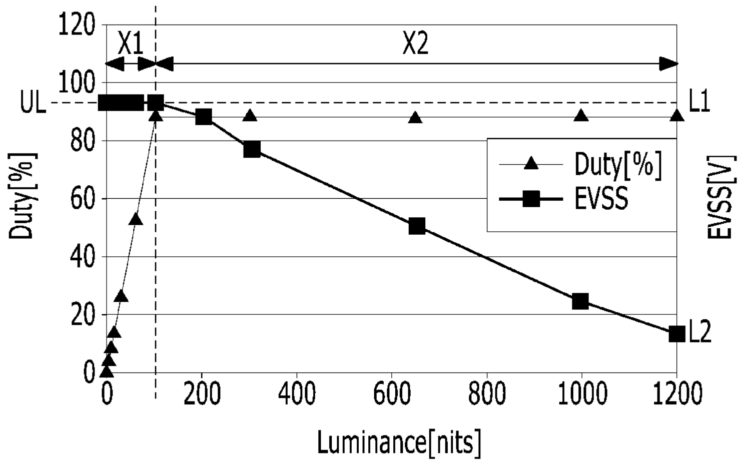
FIG. 12 is a diagram showing an example of adjusting an emission duty and a low-level source voltage in a first luminance section and a second luminance section.
Figure 13:
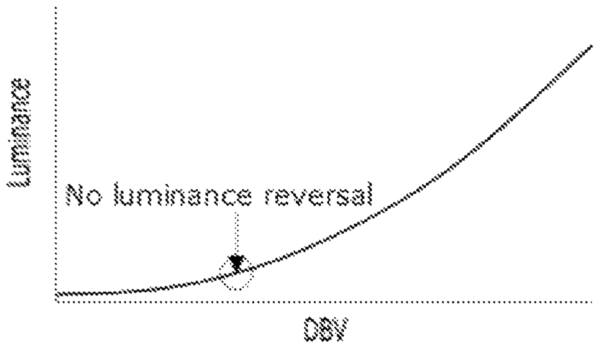
FIG. 13 is a diagram showing improvement of the luminance reversal phenomenon when the emission duty is set to 88% to 94% in a low luminance section.

FIG. 9 and FIG. 10 are diagrams showing luminance variation according to emission duty. FIG. 11 is a diagram showing occurrence of the luminance reversal phenomenon when the emission duty is set to 100% in a low luminance section. FIG. 12 is a diagram showing an example of adjusting the emission duty and the low-level source voltage in the first luminance section and the second luminance section. In addition, FIG. 13 is a diagram showing improvement of the luminance reversal phenomenon when the emission duty is set to 88% to 94% in the low luminance section.

Referring to FIG. 9 and FIG. 10, the luminance does not continuously increase as the emission duty increases. The luminance increases in proportion to the emission duty in a luminance increase section. However, the luminance decreases as the emission duty increases in a luminance decrease section. The emission duty is a PWM duty of an emission signal, and a luminance decrease section in which the luminance decreases may be generated although the PWM duty increases because the n-th second gate line 15$b(n)$ and the fourth node N4 are coupled (EM coupled) through a parasitic capacitor Cp in FIG. 3.

The luminance increase section may be a luminance section in which the PWM duty is about 0% to 87% and the luminance decrease section may be a luminance section in which the PWM duty is about 95% to 100%. A luminance section between the luminance increase section and the luminance decrease section is a luminance stagnation section. The luminance stagnation section means a luminance section having relatively small luminance variation rather than a fixed luminance section. The luminance stagnation section may be a luminance section in which the PWM duty is about 88% to 94%.

As shown in FIG. 11, the luminance reversal phenomenon in the first luminance section X1 may occur when the upper limit UL of the emission duty is set within the luminance decrease section (95% to 100%) and may be maximized when the upper limit UL of the emission duty is set to 100%. The luminance reversal phenomenon occurs because the influence of EM coupling through the parasitic capacitor is greater than the influence of driving current reduction due to emission duty reduction within the luminance decrease section (95% to 100%). The influence of EM coupling through the parasitic capacitor is maximized when the upper limit UL of the emission duty is set to 100%.

Accordingly, when the upper limit UL of the emission duty is set to be less than 100%, as shown in FIG. 12 and FIG. 13, the influence of EM coupling is reduced and thus the luminance reversal phenomenon can be improved. Particularly, when the upper limit UL of the emission duty is set within the luminance stagnation section (88% to 94%), the luminance reversal phenomenon can be further improved and smooth and natural brightness change can be realized.

On the other hand, when the upper limit UL of the emission duty is set to be less than 88%, it is difficult to achieve natural luminance change. Accordingly, it is desirable that the upper limit UL of the emission duty be set to any value in the range of 88% to 94% in consideration of power consumption reduction, image quality improvement, and luminance reversal improvement.

The aspects of the present disclosure have the following advantages.

According to the aspects of the present disclosure, image quality in the entire luminance section of the screen can be improved and power consumption can be reduced because the emission duty of a light-emitting element and the low-level source voltage are complementarily adjusted.

According to the aspects of the present disclosure, image quality in a low luminance section of the screen can be further improved because the influence of EM coupling is reduced and the luminance reversal phenomenon is improved in the low luminance section.

According to the aspects of the present disclosure, image quality in the entire luminance section of the screen can be further improved because the output voltage range of the gamma voltage string is adjusted in complementary relations with the emission duty of a light-emitting element and the low source voltage.

It will be appreciated by persons skilled in the art that the effects that can be achieved with the present disclosure are not limited to what has been particularly described hereinabove and other advantages of the present disclosure will be more clearly understood from the following detailed description.

Those skilled in the art will appreciate that various modifications and variations can be made in the present disclose without departing from the spirit or scope of the disclosure. Accordingly, the scope of the present disclosure should be determined by the appended claims and their legal equivalents, not by the above description.

What is claimed is:

1. An electroluminescent display device, comprising:

a display panel including a plurality of pixels, each pixel including a light-emitting element for emitting light;

a display brightness value adjuster configured to output brightness data with different values according to user inputs to adjust a screen luminance of the display panel;

a duty adjuster configured to adjust an emission duty of the light-emitting elements according to the brightness data that is configured based on the user inputs to adjust the screen luminance; and a power adjuster configured to adjust a low-level source voltage to be applied to the pixels according to the brightness data, wherein the screen luminance includes a first luminance range and a second luminance range having luminance higher than luminance of the first luminance range, wherein an upper limit of the emission duty of the light-emitting elements has a maximum value of less than 100% for the first luminance range, wherein the upper limit of the emission duty for the second luminance range is fixed, and wherein the low-level source voltage is fixed to a first level in the first luminance range and gradually decreases from a lower limit corresponding to a second level lower than the first level in the second luminance range.

2. The electroluminescent display device of claim 1, wherein the upper limit is in a range of 88% to 94%.

3. The electroluminescent display device of claim 1, further comprising a gamma adjuster configured to adjust an output voltage range of a gamma voltage string according to the brightness data, wherein the output voltage range of the gamma voltage string is fixed to a first voltage range in the first luminance range and gradually increases to a second voltage range wider than the first voltage range in the second luminance range.

4. The electroluminescent display device of claim 1, wherein each of the pixels further includes an emission control transistor configured to permit or block flow of a driving current applied to the light-emitting element according to an emission signal based on pulse width modulation (PWM), and wherein the emission duty of the light-emitting element conforms to a PWM duty of the emission signal.

5. An electroluminescent display device, comprising:

a display panel including a plurality of pixels, each pixel including a light-emitting element for emitting light;

a display brightness value adjuster configured to output brightness data with different values according to user inputs to adjust a screen luminance of the display panel;

a duty adjuster configured to adjust an emission duty of the light-emitting elements according to the brightness data; and a power adjuster configured to adjust a low source voltage to be applied to the pixels within a preset power supply voltage range according to the brightness data, wherein, for a low luminance range of the screen luminance, the emission duty of the light-emitting element gradually increases from 0% to an upper limit set to be less than 100%, and a low-level source voltage is fixed to a highest level within a power supply voltage range, and wherein the low-level source voltage is fixed to a first level in the low luminance range and gradually decreases from a lower limit corresponding to a second level lower than the first level in the second luminance range.

6. The electroluminescent display device of claim 5, wherein the upper limit is in a range of 88% to 94%.

7. The electroluminescent display device of claim 5, further comprising a gamma adjuster configured to adjust an output voltage range of a gamma voltage string according to the brightness data, wherein the output voltage range of the gamma voltage string is fixed to a narrowest first voltage range in the low luminance range.

8. The electroluminescent display device of claim 7, wherein, when the emission duty of the light-emitting element corresponds to the upper limit, the low source voltage gradually decreases to a lowest level within the power supply voltage range.

9. The electroluminescent display device of claim 8, wherein the output voltage range of the gamma voltage string gradually increases to a second voltage range wider than a first voltage range in a remaining luminance range of the screen luminance, which has luminance higher than luminance of the low luminance range.

10. The electroluminescent display device of claim 5, wherein each of the pixels further includes an emission control transistor configured to permit or block flow of a driving current applied to the light-emitting element according to an emission signal based on pulse width modulation (PWM), and wherein the emission duty of the light-emitting element conforms to a PWM duty of the emission signal.

11. A method for driving an electroluminescent display device having a display panel including a plurality of pixels each including a light-emitting element, the method comprising:

outputting brightness data with different values according to user inputs to adjust a screen luminance of the display panel;

adjusting an emission duty of light-emitting elements according to the brightness data; and adjusting a low source voltage to be applied to the pixels according to the brightness data, wherein the screen luminance includes a first luminance range and a second luminance range having luminance higher than luminance of the first luminance range, wherein an upper limit of the emission duty of the light-emitting elements gradually increases to be less than 100% in the first luminance range, and wherein the upper limit of the emission duty is fixed for the second luminance range, and wherein the low-level source voltage is fixed to a first level in the first luminance range and gradually decreases from a lower limit corresponding to a second level lower than the first level in the second luminance range.

12. The method of claim 11, wherein the upper limit is in a range of 88% to 94%.

13. The method of claim 11, further comprising adjusting an output voltage range of a gamma voltage string according to the brightness data, wherein the output voltage range of the gamma voltage string is fixed to a first voltage range in the first luminance range and gradually increases to a second voltage range wider than the first voltage range in the second luminance range.

14. A method for driving an electroluminescent display device having a display panel including a plurality of pixels each including a light-emitting element, the method comprising:

outputting brightness data with different values according to user inputs to adjust a screen luminance of the display panel;

adjusting an emission duty of the light-emitting elements according to the brightness data; and adjusting a low-level source voltage to be applied to the pixels within a preset power supply voltage range according to the brightness data, wherein, in a low luminance range of the screen luminance, an upper limit of the emission duty of the light-emitting elements gradually increases from 0% to less than 100%, and the low-level source voltage is fixed to a highest level within a power supply voltage range, and wherein the low-level source voltage is fixed to a first level in the low luminance range and gradually decreases from a lower limit corresponding to a second level lower than the first level in the second luminance range.

15. The method of claim 14, wherein the upper limit is in a range of 88% to 94%.

16. The method of claim 14, further comprising adjusting an output voltage range of a gamma voltage string according to the brightness data, wherein the output voltage range of the gamma voltage string is fixed to a narrowest first voltage range in the low luminance range.

17. The method of claim 16, wherein, when the emission duty of the light-emitting is fixed to the upper limit, the low-level source voltage gradually decreases to a lowest level within the power supply voltage range.

18. The method of claim 17, wherein the output voltage range of the gamma voltage string gradually increases to a second voltage range wider than a first voltage range in the remaining luminance range of the screen luminance, which has luminance higher than luminance of the low luminance range.

* * * * *